US012358109B2

(12) United States Patent
Kurth et al.

(10) Patent No.: US 12,358,109 B2
(45) Date of Patent: Jul. 15, 2025

(54) DRIVING-IN APPARATUS

(71) Applicant: Hilti Aktiengesellschaft, Schaan (LI)

(72) Inventors: Emanuel Kurth, Chur (CH); Alain Erni, Wil (CH); Fabio Luongo, Wil (CH); Michael Pulfer, Wil (CH)

(73) Assignee: Hilti Aktiengesellschaft, Schaan (LI)

( * ) Notice: Subject to any disclaimer, the term of this patent is extended or adjusted under 35 U.S.C. 154(b) by 194 days.

(21) Appl. No.: 17/416,436

(22) PCT Filed: Nov. 29, 2019

(86) PCT No.: PCT/EP2019/083008

§ 371 (c)(1),
(2) Date: Jun. 18, 2021

(87) PCT Pub. No.: WO2020/126403

PCT Pub. Date: Jun. 25, 2020

(65) Prior Publication Data

US 2022/0072690 A1 Mar. 10, 2022

(30) Foreign Application Priority Data

Dec. 19, 2018 (EP) .................................... 18213987

(51) Int. Cl.
*B25C 1/04* (2006.01)
*B25C 1/06* (2006.01)

(52) U.S. Cl.
CPC ................ *B25C 1/047* (2013.01); *B25C 1/06* (2013.01)

(58) Field of Classification Search
CPC .. B25C 1/047; B25C 1/06; B25C 1/00; B25C 5/15; B25C 1/04; B25C 1/041
See application file for complete search history.

(56) References Cited

U.S. PATENT DOCUMENTS 7,537,146 B2 5/2009 Schiestl
9,302,381 B2 4/2016 Kondou et al.
(Continued)

FOREIGN PATENT DOCUMENTS

DE 10 2005 000 089 A1 1/2007
EP 2 489 474 A2 8/2012
(Continued)

OTHER PUBLICATIONS

International Search Report and Written Opinion in International Application No. PCT/EP2019/083008, mailed Mar. 4, 2020.

*Primary Examiner* — Veronica Martin
(74) *Attorney, Agent, or Firm* — Leydig, Voit & Mayer, Ltd.

(57) ABSTRACT

An apparatus driving fastening elements has an energy store, a transmission element movable along a setting axis in a driving direction between a starting position and a setting position for transmitting energy from the energy store to the fastening elements, the transmission element having a rear end in the driving direction, the energy store having a container and a piston, the container defining a cylinder axis and the piston being movable along the cylinder axis in the container, the piston closing off a partial volume of the container, and gas in the closed-off partial volume forming a gas spring, the apparatus having a force transmission device transmitting a spring force of the gas spring to the rear end of the transmission element, the rear end of the transmission element being arranged behind the piston in the driving direction when the transmission element is in the starting position.

15 Claims, 5 Drawing Sheets

(56) References Cited

U.S. PATENT DOCUMENTS

| | | | | |
|---|---|---|---|---|
| 9,505,115 | B2 | 11/2016 | Kondou et al. | |
| 2007/0023472 | A1 | 2/2007 | Schiestl | |
| 2012/0211540 | A1* | 8/2012 | Kondou | B25C 1/00 227/140 |
| 2014/0326776 | A1* | 11/2014 | Riedl | B25C 1/00 227/146 |
| 2015/0258671 | A1 | 9/2015 | Kondou et al. | |
| 2016/0303723 | A1* | 10/2016 | Franz | B25F 5/021 |
| 2017/0036332 | A1 | 2/2017 | Kondou et al. | |
| 2018/0207777 | A1 | 7/2018 | Cheatham et al. | |
| 2019/0224825 | A1* | 7/2019 | Pedicini | B25C 1/06 |

FOREIGN PATENT DOCUMENTS

| | | | |
|---|---|---|---|
| EP | 3 159 113 | A1 | 4/2017 |
| TW | 201607703 | A | 3/2016 |

* cited by examiner

DRIVING-IN APPARATUS

CROSS-REFERENCE TO RELATED APPLICATIONS

This patent application is the U.S. National Stage of International Patent Application No. PCT/EP2019/083008, filed Nov. 29, 2019, which claims the benefit of European Patent Application No. 18213987.3, filed Dec. 19, 2018, which are each incorporated by reference.

TECHNICAL FIELD

The application relates to an apparatus for driving a fastening element into a base material.

PRIOR ART

It is known in apparatuses of this type to store mechanical energy temporarily in a mechanical energy store and to transmit said energy in a sudden burst to a fastening element. Use is conventionally made for this purpose of an energy transmission element, for example in the form of a piston, which is arranged in a driving direction between the mechanical energy store and the fastening element and moves to and fro. Such apparatuses therefore have relatively large dimensions in the driving direction. In some areas of use, it is desirable to provide an apparatus in which said dimensions are reduced.

SUMMARY OF THE INVENTION

The object is achieved in an apparatus for driving a fastening element into a base material, having a mechanical energy store for storing mechanical energy, and an energy transmission element which is movable along a setting axis and in a driving direction between a starting position and a setting position and which serves for transmitting energy from the mechanical energy store to the fastening element, wherein the energy transmission element has a rear end in the driving direction, wherein the mechanical energy store has a first cylindrical container and a first piston, wherein the first cylindrical container defines a first cylinder axis and the first piston is arranged movably along the first cylinder axis in the first cylindrical container, and therefore the first piston closes off a partial volume of the first cylindrical container and a gas arranged in the closed-off partial volume of the first cylindrical container forms a first gas spring, wherein the apparatus furthermore has a force transmission device which transmits a spring force of the first gas spring to the rear end of the energy transmission element, and wherein the rear end of the energy transmission element is arranged behind the first piston in the driving direction when the energy transmission element is arranged in the starting position. Owing to the transmission of the spring force of the first gas spring to a location behind the first piston, it is possible to reduce the space required by the apparatus in the driving direction. The first cylinder axis preferably runs parallel to the setting axis.

An advantageous embodiment is characterized in that the apparatus furthermore has a roller train which has a first roller holder with a first roller and a band running around the first roller, wherein the first roller holder is mechanically connected to the first piston and transmits a movement of the first piston to the band, wherein the band lies against the rear end of the energy transmission element. Under some circumstances, the band damps the impact accelerations of the energy transmission element and/or of the apparatus in relation to the gas springs and the seals thereof, and therefore the service life of the apparatus is increased.

An advantageous embodiment is characterized in that the rear end of the energy transmission element is arranged in front of the first piston in the driving direction when the energy transmission element is arranged in the setting position. This means that the energy transmission element on its path in the driving direction from the starting position into the setting position covers a greater distance than the first piston, and therefore the space required by the apparatus is additionally reduced under some circumstances. Under some circumstances, the lower speed of the first piston relieves the load on the seals thereof, which are thereby exposed to lower wear.

An advantageous embodiment is characterized in that the mechanical energy store has one or more further cylindrical containers and one or more further pistons, wherein the further cylindrical containers each define a further cylinder axis, and the further pistons are arranged movably along the respective further cylinder axis in the respective further cylindrical container, and therefore the further pistons each close off a partial volume of the respective further cylindrical container, and a gas arranged in the respective closed-off partial volume of the respective further cylindrical container forms a further gas spring, and wherein the force transmission device transmits a spring force of the further gas springs to the rear end of the energy transmission element. The further cylinder axes preferably run parallel to the setting axis. The first and all further cylinder axes are preferably also arranged distributed uniformly around the setting axis. This makes it possible to reduce or avoid tilting moments which occur during a transmission of force from the gas springs to the energy transmission element and which could otherwise act on the energy transmission element. Alternatively or additionally, the gas springs are connected pneumatically to one another. An associated pressure equalization between the gas springs likewise counteracts possible tilting moments.

An advantageous embodiment is characterized in that the apparatus has an energy transmission device for transmitting energy from an energy source to the mechanical energy store. The apparatus preferably has the energy source. The energy source particularly preferably comprises an electrical battery.

An advantageous embodiment is characterized in that the energy transmission device comprises a motor and a motion converter for converting a rotational movement of the motor into a linear movement of the first piston with a rotary drive and a linear output, wherein the motion converter is preferably arranged on the setting axis. The motion converter preferably comprises a spindle drive which is driven by the motor and has a threaded spindle and a spindle nut. Alternatively, the motion converter comprises a drum roller which is driven by the motor and onto which a cable or band, preferably the band of the roller train, is wound.

An advantageous embodiment is characterized in that the apparatus comprises a clutch device for temporarily holding the energy transmission element in the starting position, wherein the clutch device is preferably arranged on the setting axis. The clutch device preferably has an open and a closed state, wherein the clutch device temporarily holds the driving element in the starting position in the closed state of the clutch device.

EXEMPLARY EMBODIMENTS

Exemplary embodiments of an apparatus for driving a fastening element into a base material are explained in more detail below on the basis of examples with reference to the drawings, in which.

Figure 3:
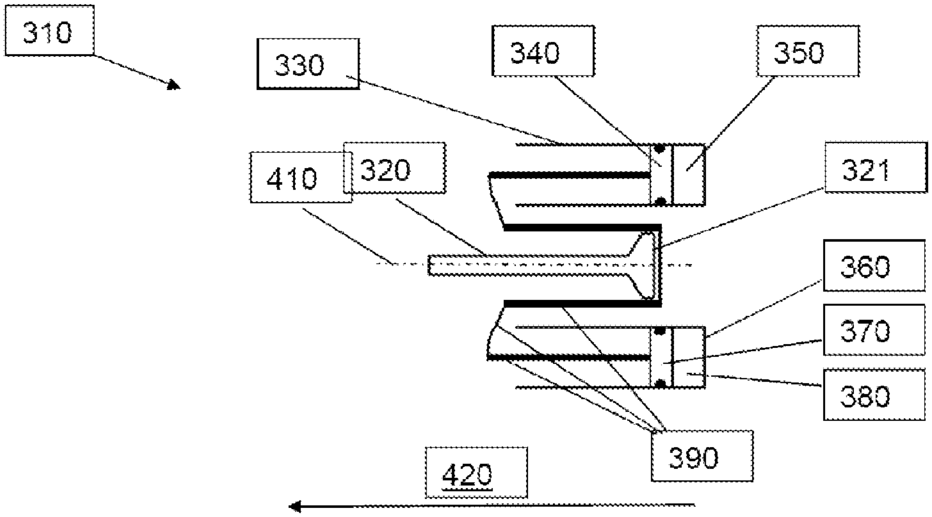
Figure 4:
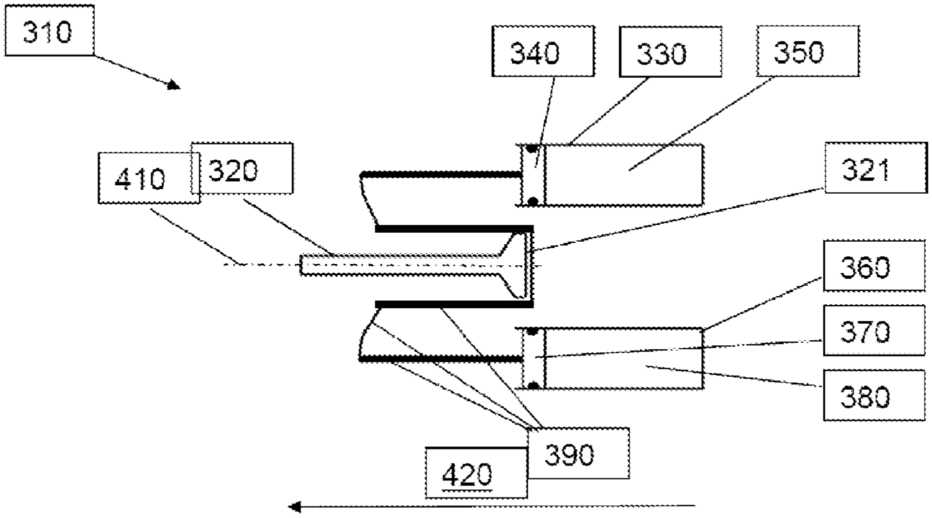
Figure 5:
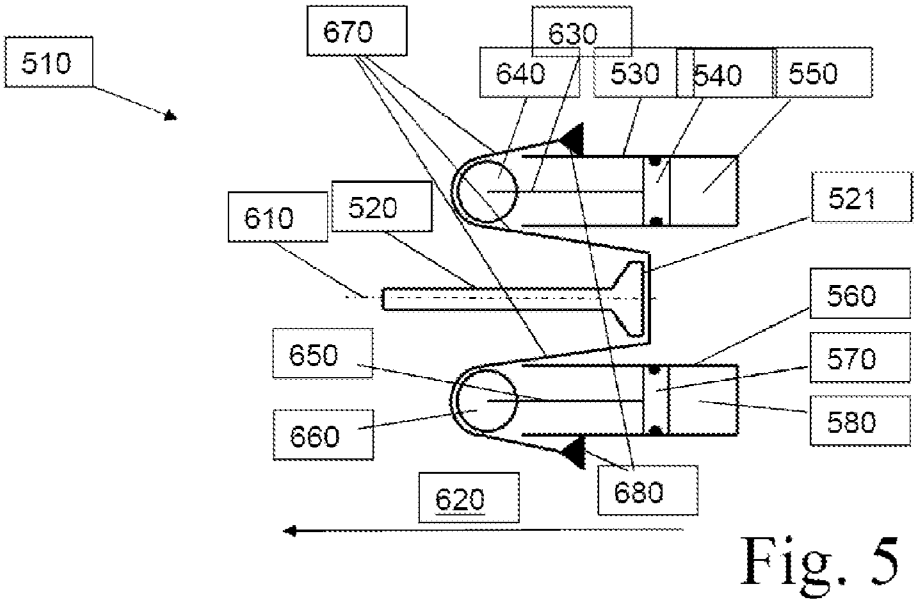
Figure 6:
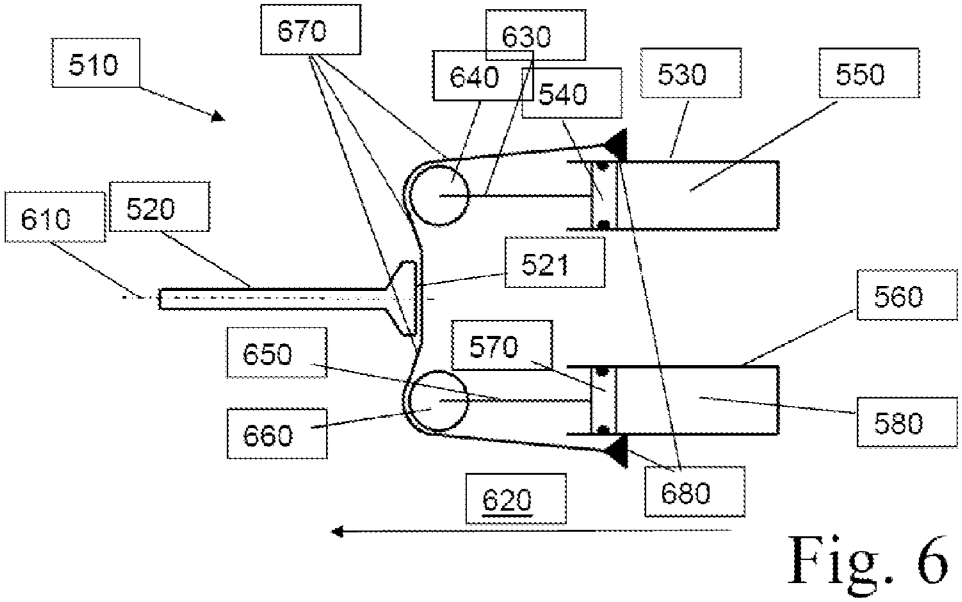
Figure 7:
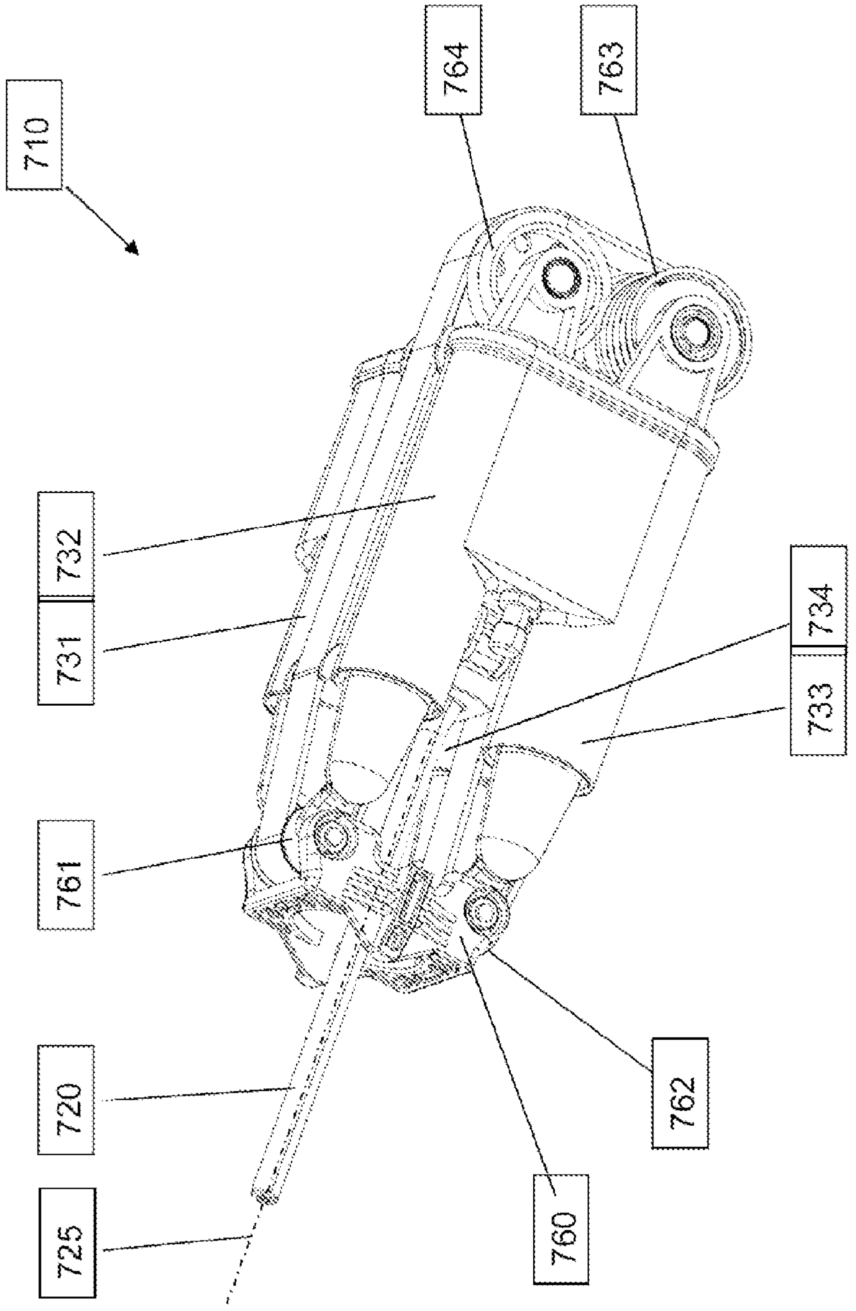

FIG. 3 schematically shows a drive and an energy transmission element in a tensioned state, FIG. 4 shows the drive from FIG. 3 in a relaxed state, FIG. 5 schematically shows a drive and an energy transmission element in a tensioned state, FIG. 6 shows the drive from FIG. 5 in a relaxed state, and FIG. 7 shows a drive with an energy transmission element.

Figure 1:
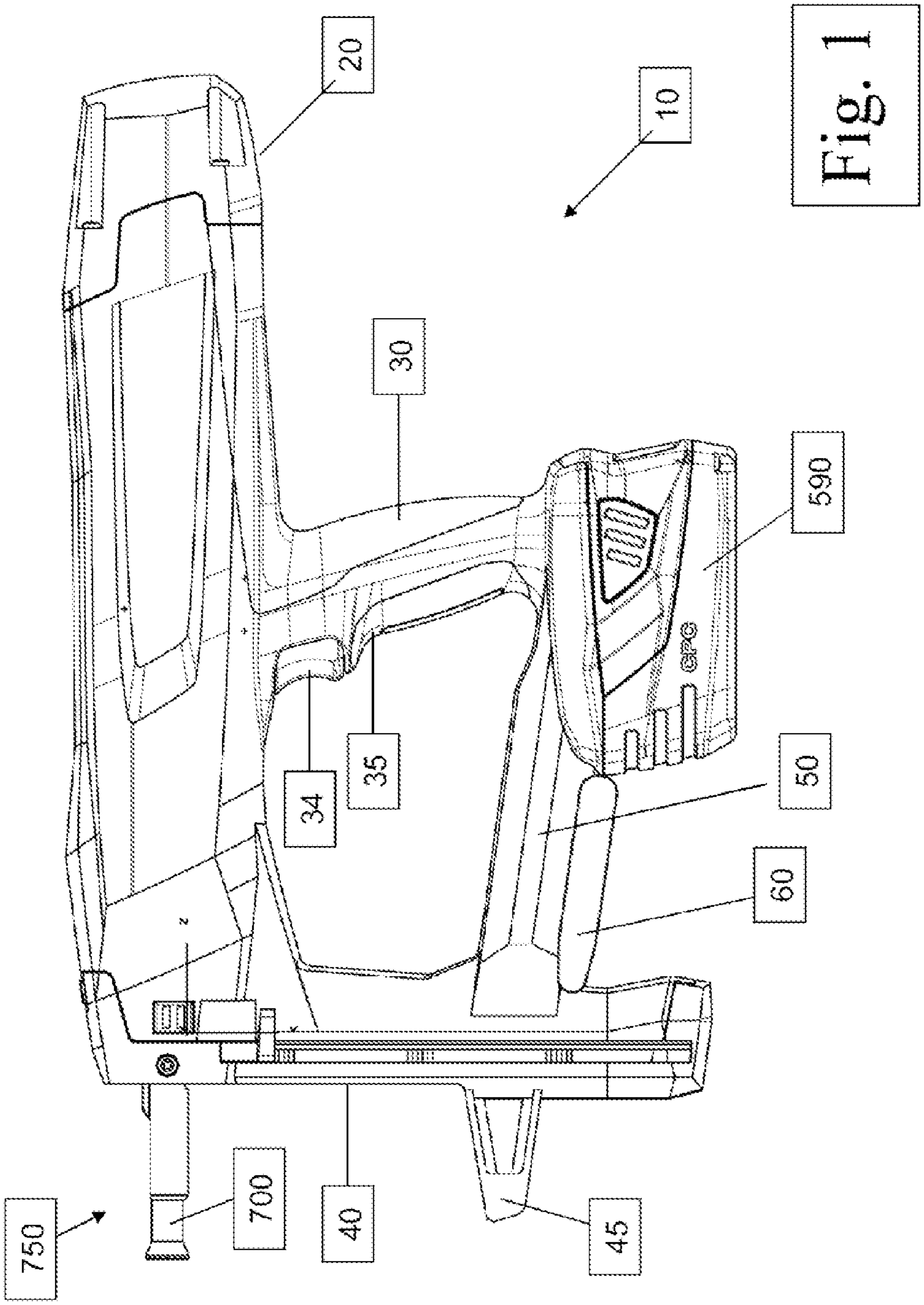
FIG. 1 shows a side view of a driving apparatus.

FIG. 1 shows in a side view a driving apparatus 10 for driving a fastening element, for example a nail or bolt, into a base material. The driving apparatus 10 has an energy transmission element (not represented) for transmitting energy to the fastening element and also a housing 20 containing the energy transmission element and a power unit (likewise not represented) for conveying the energy transmission element.

The driving apparatus 10 also has a handle 30, a magazine 40 and a bridge 50 connecting the handle 30 to the magazine 40. Attached to the bridge 50 are a scaffold hook 60 for suspending the driving apparatus 10 on a scaffold or the like, and an electrical energy store designed as an electrical storage battery 590. On the handle 30, a trigger 34 and a grip sensor designed as a hand switch 35 are arranged. Furthermore, the driving apparatus 10 has a guide channel 700 for guiding the fastening element and a pressing device 750 for detecting a distance of the driving apparatus 10 from a base material (not represented). Aligning the driving apparatus perpendicularly to a substrate is assisted by an alignment aid 45.

Figure 2:
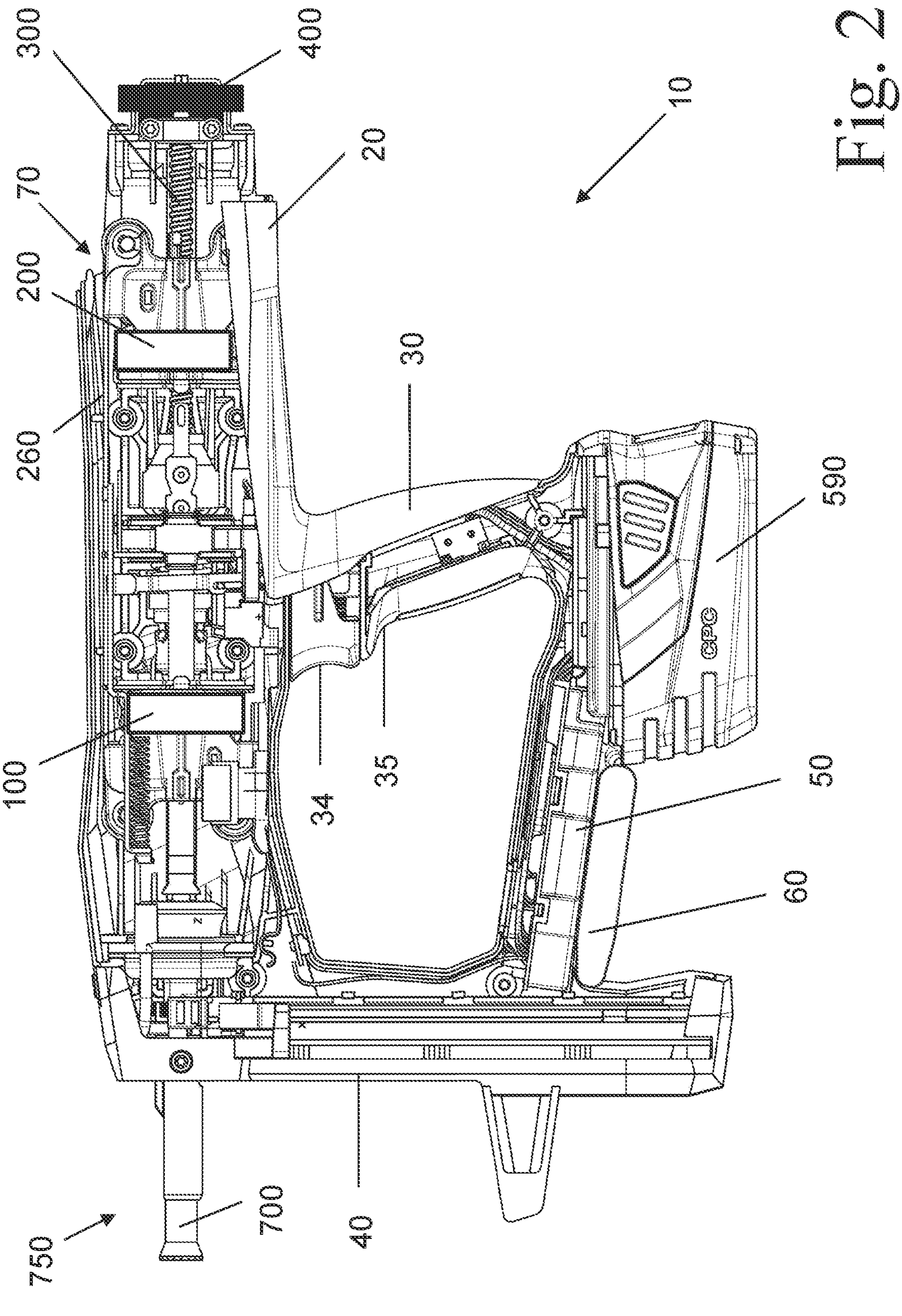
FIG. 2 shows a side view of the driving apparatus with an opened housing.

FIG. 2 shows the driving apparatus 10 with an opened housing 20. The housing 20 contains a power unit 70 for conveying an energy transmission element that is concealed in the drawing. The power unit 70 comprises an electric motor (not represented) for converting electrical energy from the storage battery 590 into rotational energy, a torque transmission device comprising a gear mechanism 400 for transmitting a torque of the electric motor to a motion converter formed as a spindle drive 300, a force transmission device comprising a roller train 260 for transmitting a force from the motion converter to a mechanical energy store formed as a spring 200 and for transmitting a force from the gas spring 200 to the energy transmission element, and a clutch device 100 for temporarily holding the energy transmission element in the starting position.

FIGS. 3 and 4 schematically show a drive 310 designed as a mechanical energy store and an energy transmission element 320 which is designed as a setting piston and has a rear end 321. The drive 310 comprises a first cylindrical container 330, which defines a first cylinder axis, and a first piston 340, which is arranged movably along the first cylinder axis in the first cylindrical container 330. The first piston 340 closes off a partial volume of the first cylindrical container 330, and therefore a gas arranged in the closed-off partial volume of the first cylindrical container 330, for example air, forms a first gas spring 350. The drive 310 furthermore comprises a further cylindrical container 360, which defines a further cylinder axis, and a further piston 370, which is arranged movably along the further cylinder axis in the further cylindrical container 360. The further piston 370 closes off a partial volume of the further cylindrical container 360, and therefore a gas arranged in the closed-off partial volume of the further cylindrical container 360, for example air, forms a further gas spring 350.

The drive 310 has a force transmission device which is designed as a preferably rigid linkage 390 and transmits a spring force of the first gas spring 350 and of the further gas spring 380 to the rear end 321 of the energy transmission element 320. The energy transmission element 320 is thereby accelerated along a setting axis 410 in a driving direction 420 and moved toward a fastening element (not shown). The first cylinder axis and the further cylinder axis preferably run parallel to the setting axis 410. In addition, the first cylinder axis and the further cylinder axis are opposite each other with respect to the setting axis 410, that is to say are arranged distributed uniformly about the setting axis 410.

The energy transmission element 320 is in its starting position in FIG. 3 and in its setting position in FIG. 4, that is to say after a driving operation. In both positions, the rear end 321 of the energy transmission element 320 is arranged in the driving direction 420 behind a front end side of the first piston 340 and a front end side of the further piston 370. In exemplary embodiments which are not shown, the rear end of the energy transmission element is arranged in the driving direction behind the complete first piston and/or behind the complete further piston.

FIGS. 5 and 6 schematically show a drive 510 designed as a mechanical energy store and an energy transmission element 520 which is designed as a setting piston and has a rear end 521. The drive 510 comprises a first cylindrical container 530, which defines a first cylinder axis, and a first piston 540, which is arranged movably along the first cylinder axis in the first cylindrical container 530. The first piston 540 closes off a partial volume of the first cylindrical container 530, and therefore a gas arranged in the closed-off partial volume of the first cylindrical container 530, for example air, forms a first gas spring 550. The drive 510 comprises a further cylindrical container 560, which defines a further cylinder axis, and a further piston 570, which is arranged movably along the further cylinder axis in the further cylindrical container 560. The further piston 570 closes off a partial volume of the further cylindrical container 560, and therefore a gas arranged in the closed-off partial volume of the further cylindrical container 560, for example air, forms a further gas spring 550.

The drive 510 has a roller train which has a first roller holder 630 with a first roller 640, a further roller holder 650 with a further roller 660 and a force transmission element 670 which runs around the first roller 640 and around the second roller 660 and is designed as a band. The first roller holder 630 is mechanically connected, preferably fastened, to the first piston 540 and transmits a movement of the first piston 540 to the force transmission element 670. The further roller holder 650 is mechanically connected, preferably fastened, to the further piston 570 and transmits a movement of the further piston 570 to the force transmission element 670. The force transmission element 670, for its part, lies against the rear end 521 of the energy transmission element 520 and transmits a spring force of the first gas spring 550 and of the second gas spring 580 to the energy transmission element 520. The energy transmission element 520 is thereby accelerated along a setting axis 610 in a driving direction 620 and moved toward a fastening element (not shown). The first cylinder axis and the further cylinder axis preferably run parallel to the setting axis 610. In addition, the first cylinder axis and the further cylinder axis are opposite each other with respect to the setting axis 610, that is to say are arranged distributed uniformly about the setting axis 610.

The energy transmission element 520 is in its starting position in FIG. 5 and in its setting position in FIG. 6, that is to say after a driving operation. In the starting position, the rear end 521 of the energy transmission element 520 is arranged in the driving direction 620 behind a front end side of the first piston 540 and a front end side of the further piston 570. In exemplary embodiments which are not shown, the rear end of the energy transmission element is arranged in the driving direction behind the complete first piston and/or behind the complete further piston.

The force transmission element 670 is fixed at its ends to a housing 680 of the driving apparatus, not shown further. A movement of the first piston 540 and of the second piston 570 is thereby transmitted with a transmission factor of two to the energy transmission element 520. Consequently, in the setting position, the rear end 521 of the energy transmission element 520 is arranged in the driving direction 620 in front of the front end side of the first piston 540 and the front end side of the further piston 570, and therefore in front of the complete piston 540, 570.

FIG. 7 shows a drive 710 designed as a mechanical energy store and an energy transmission element 720 which is designed as a setting piston and moves along a setting axis 725. The drive 710 comprises a first cylindrical container 731 with a first piston, and three further cylindrical containers 732, 733, 734 each having a further piston. A gas spring is situated in each of the cylindrical containers. The four gas springs are arranged distributed uniformly around the setting axis 725.

The drive 710 has a roller train which comprises a single roller holder 760 with a first roller 761 and a second roller 762. All four pistons are connected in a force-transmitting manner to the roller holder 760, preferably fastened thereto. The roller train furthermore comprises a band 770 which around the first roller 761, a rear end (not shown) of the energy transmission element 720, the second roller 762 and two further rollers 763, 764 such that the band 770 is configured as a revolving band. A movement of the pistons is thereby transmitted to the energy transmission element 720 with a transmission factor of two.

The invention has been explained above on the basis of a number of exemplary embodiments of a driving apparatus. The features described can be transferred individually or in combination from each exemplary embodiment to all other exemplary embodiments as long as they do not contradict one another. It should be noted that the apparatus according to the invention can also be used for other purposes.

The invention claimed is:

1. An apparatus for driving a fastening element into a base material, having a mechanical energy store for storing mechanical energy; and an energy transmission element movable along a setting axis and in a driving direction between a starting position and a setting position and which serves for transmitting energy from the mechanical energy store to the fastening element, wherein the energy transmission element has a rear end in the driving direction, wherein the mechanical energy store has a first cylindrical container and a first piston, wherein the first cylindrical container defines a first cylinder axis and the first piston is arranged movably along the first cylinder axis in the first cylindrical container, and the first piston closes off a partial volume of the first cylindrical container and a gas arranged in the closed-off partial volume of the first cylindrical container forms a first gas spring, wherein the apparatus further comprises a force transmission device which transmits a spring force of the first gas spring to the rear end of the energy transmission element to thereby accelerate the energy transmission element in the driving direction, wherein the rear end of the energy transmission element is arranged behind the first piston in the driving direction when the energy transmission element is arranged in the starting position; and comprises a roller train which has a first roller holder with a first roller and a band running around the first roller, wherein the first roller holder is mechanically fastened to the first piston and transmits a movement of the first piston to the band, wherein the band lies against the rear end of the energy transmission element.

2. The apparatus as claimed in claim 1, wherein the rear end of the energy transmission element is arranged in front of the first piston in the driving direction when the energy transmission element is arranged in the setting position.

3. The apparatus as claimed in claim 2, wherein the first cylinder axis runs parallel to the setting axis.

4. The apparatus as claimed in claim 2, wherein the mechanical energy store has one or more further cylindrical containers and one or more further pistons, wherein the further cylindrical containers each define a further cylinder axis, and the further pistons are arranged movably along the respective further cylinder axis in the respective further cylindrical container, and the further pistons each close off a partial volume of the respective further cylindrical container, and a gas arranged in the respective closed-off partial volume of the respective further cylindrical container forms a further gas spring, and wherein the force transmission device transmits a spring force of the further gas springs to the rear end of the energy transmission element.

5. The apparatus as claimed in claim 4, wherein the further cylinder axes run parallel to the setting axis.

6. The apparatus as claimed in claim 1, wherein the first cylinder axis runs parallel to the setting axis, and wherein the energy transmission element is moved in a same direction as the first piston moves.

7. The apparatus as claimed in claim 6, wherein the mechanical energy store has one or more further cylindrical containers and one or more further pistons, wherein the further cylindrical containers each define a further cylinder axis, and the further pistons are arranged movably along the respective further cylinder axis in the respective further cylindrical container, and the further pistons each close off a partial volume of the respective further cylindrical container, and a gas arranged in the respective closed-off partial volume of the respective further cylindrical container forms a further gas spring, and wherein the force transmission device transmits a spring force of the further gas springs to the rear end of the energy transmission element.

8. The apparatus as claimed in claim 7, wherein the further cylinder axes run parallel to the setting axis.

9. The apparatus as claimed in claim 1, wherein the mechanical energy store has one or more further cylindrical containers and one or more further pistons, wherein the further cylindrical containers each define a further cylinder axis, and the further pistons are arranged movably along the respective further cylinder axis in the respective further cylindrical container, and the further pistons each close off a partial volume of the respective further cylindrical container, and a gas arranged in the respective closed-off partial volume of the respective further cylindrical container forms a further gas spring, and wherein the force transmission device transmits a spring force of the further gas springs to the rear end of the energy transmission element.

10. The apparatus as claimed in claim 9, wherein the further cylinder axes run parallel to the setting axis.

11. The apparatus as claimed in claim 10, wherein the first and all further cylinder axes are arranged distributed uniformly around the setting axis.

12. The apparatus as claimed in claim 9, wherein the first and all further cylinder axes are arranged distributed uniformly around the setting axis.

13. The apparatus as claimed in claim 1, further comprising an energy transmission device for transmitting energy from an energy source to the mechanical energy store.

14. The apparatus as claimed in claim 13, wherein the energy transmission device comprises a motion converter for converting a rotational movement into a linear movement with a rotary drive and a linear output, wherein the motion converter is arranged on the setting axis.

15. The apparatus as claimed in claim 1, further comprising a clutch device for temporarily holding the energy transmission element in the starting position, wherein the clutch device is arranged on the setting axis.

* * * * *